UNITED STATES PATENT OFFICE.

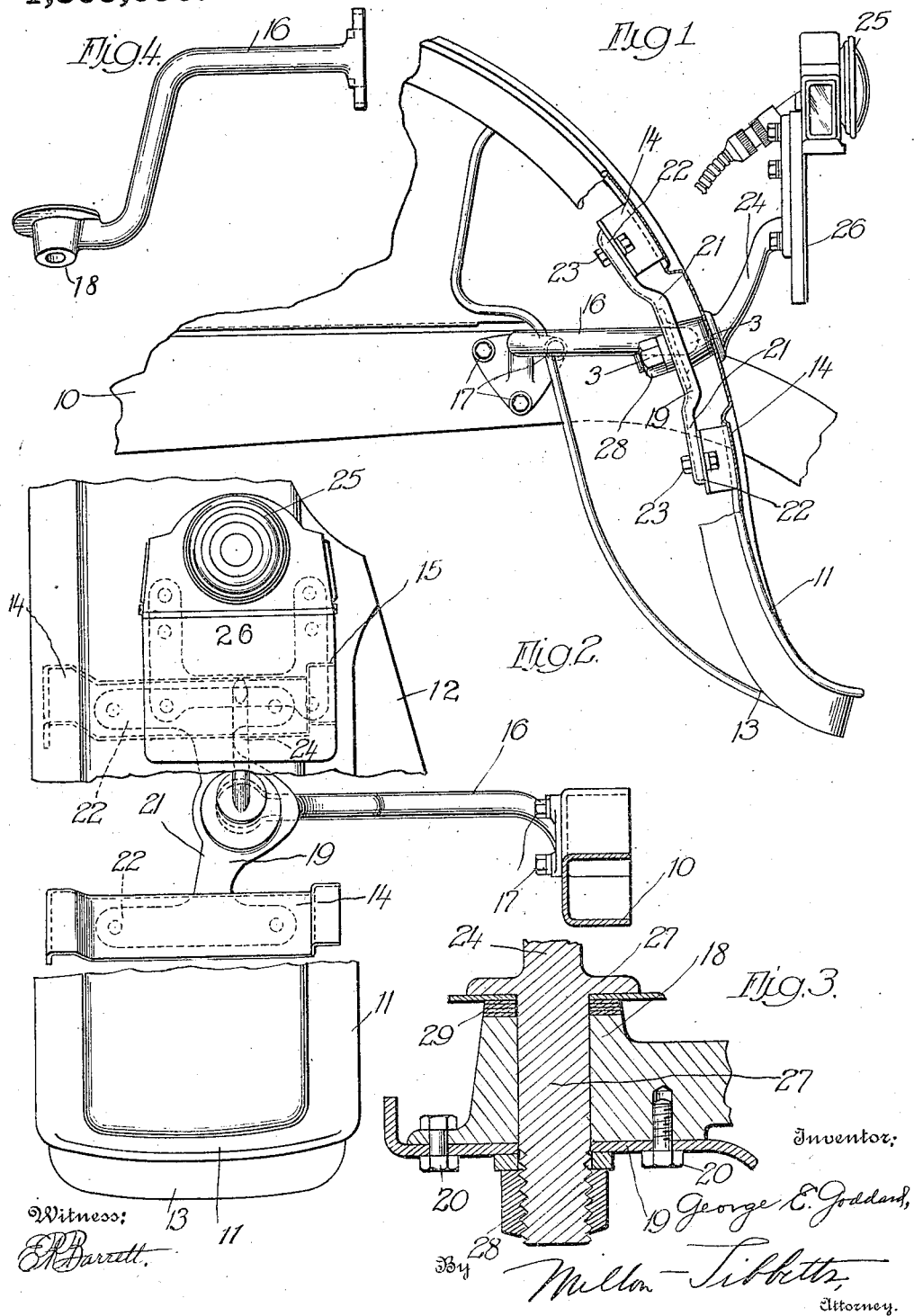

GEORGE E. GODDARD, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE FENDER AND BRACKET CONSTRUCTION.

1,305,090.  Specification of Letters Patent.  Patented May 27, 1919.

Application filed June 10, 1916. Serial No. 102,944.

*To all whom it may concern:*

Be it known that I, GEORGE E. GODDARD, a citizen of the United States, and resident of Detroit, Wayne county, State of Michigan, have invented certain new and useful Improvements in Motor-Vehicle Fender and Bracket Constructions, of which the following is a specification.

This invention relates to motor vehicles, and particularly to the fender and bracket construction thereof.

The salient object of the invention is to provide a simple, well appearing fender and lamp bracket support, and one that will be rigid and strong without subjecting the fender to undue racking or twisting.

Other objects of the invention will appear from the following description taken in connection with the drawings which form a part of this specification, and in which:—

Figure 1 is a side elevation of the rear part of a motor vehicle embodying this invention, parts being broken away;

Fig. 2 is a rear view with parts broken away; and

Fig. 3 is an enlarged section on the line 3—3 of Fig. 1.

Fig. 4 is a view of the fender supporting bracket.

In the drawings, 10 represents one of the side members of a motor vehicle frame and 11 is a curved fender adapted to cover one of the vehicle wheels, not shown. The fender 11 has a side apron 12 which extends to the frame side member as shown, and it is further formed with a flange 13 along its outer edge. A pair of plates or cleats 14 are secured to the fender in suitably spaced relation on its inner or underneath side, the cleats preferably being formed with in-turned flanges 15 for securing them to the apron 12 and flange 13.

The forward part of the fender 11 is not shown and it will be understood that it may be supported in any desired way, but the rear part of the fender is supported from the frame by a bracket 16 which is secured to the member 10 as by bolts 17 and extends outwardly from the frame to a point between the cleats 14. The outer end of the bracket is preferably in the form of a boss 18, and a plate 19, which may be formed integrally with the bracket or stamped out of sheet metal separately and secured to the bracket as by bolts 20 or by spot welding, is in the form of laterally extending arms 21 each of which has a cross arm 22 secured at several points to one of the cleats 14 as at 23. Thus the fender is rigidly supported from the frame and there is no twisting of the fender and no unsightly bolts are visible on the outer face thereof.

A supporting bracket 24 for a lamp 25 and license plate 26 may also be supported from the bracket 16 by forming the lamp bracket with a bolt or extension 27 which extends through the fender and into and through the boss 18. A nut 28 secures the parts together, clamping the fender tightly between the two brackets. Shims or washers 29 may be used to correct slight inaccuracies in manufacture when the parts are being assembled so that the fender will not be bent where it is clamped.

Other forms of the invention may be made without departing from the spirit or scope of the invention as indicated by the appended claims.

Having thus described my invention, what I claim and desire to secure by Letters Patent is:—

1. In a motor vehicle, the combination with the frame thereof, of a fender, a pair of spaced cleats secured thereto, a bracket secured to the frame, and having a boss arranged between said cleats, said bracket also having arms secured to said cleats and a lamp bracket extending from the opposite side of the fender and having a bolt passing through the fender and into said boss.

2. In a motor vehicle, the combination of a fender, a bracket on the inner face of said fender secured thereto at spaced points and a bracket on the outer face of said fender, and means extending from one bracket through the fender intermediate the spaced points and into the other bracket for securing the fender between the two brackets.

3. In a motor vehicle, the combination of a fender, a bracket on the inner face of said fender and a bracket on the outer face of said fender, one of said brackets having arms secured to said fender in spaced relation and the other, having a bolt extending through the fender and into the former bracket intermediate the arms to secure the fender between the brackets.

4. In a motor vehicle, the combination with the frame thereof, of a fender, a pair of separated cleats on the fender, a bracket secured to the frame and extending to a point between said cleats, a plate on said bracket having arms extending to said cleats, and means for securing each of said arms to a cleat at a plurality of points.

5. In a motor vehicle, the combination with the frame thereof, of a fender, a pair of separated cleats on the fender, a bracket secured to the frame and extending to a point between said cleats, a plate on said bracket having arms extending to said cleats, means for securing said arms to said cleats, and means passing through the fender and through said bracket and plate to secure the fender directly to the bracket.

6. In a motor vehicle, the combination with the vehicle frame, of a fender, a bracket extending from the frame to the underneath side of the fender, a support bracket arranged on the other side of the fender, and means extending from the support bracket through the fender and said first named bracket for securing the fender and brackets together.

7. In a motor vehicle, the combination with the vehicle frame, of a fender, a bracket extending from the frame to the underneath side of the fender, and having a boss, and a support bracket arranged on the other side of the fender and having a shank extending through the fender and through said boss for securing the fender and brackets together.

8. In a motor vehicle, the combination with the frame thereof, of a fender, a bracket secured to the frame and having a plurality of arms, spaced cleats secured to the fender, means securing said arms to said cleats, and means passing through the fender and through the bracket between said cleats for securing the fender directly to the bracket.

9. In a motor vehicle, the combination with the frame thereof, of a fender, a bracket secured to the frame, said bracket having a plurality of arms, and a boss intermediate said arms, means securing said arms to the underside of said fender, a second bracket extending from the upper side of said fender and having a shank extending through the fender and boss for securing the brackets and fender together.

In testimony whereof I affix my signature.

GEORGE E. GODDARD.

Copies of this patent may be obtained for five cents each, by addressing the "Commissioner of Patents, Washington, D. C."